(12) United States Patent
Nielsen et al.

(10) Patent No.: US 8,944,766 B2
(45) Date of Patent: Feb. 3, 2015

(54) ROTOR LOCK FOR A WIND TURBINE

(75) Inventors: Flemming Selmer Nielsen, Hammel (DK); Erik Markussen, Videbaek (DK)

(73) Assignee: Vestas Wind Systems A/S, Aarhus N. (DK)

( * ) Notice: Subject to any disclaimer, the term of this patent is extended or adjusted under 35 U.S.C. 154(b) by 577 days.

(21) Appl. No.: 13/255,706

(22) PCT Filed: Mar. 8, 2010

(86) PCT No.: PCT/EP2010/052881
§ 371 (c)(1),
(2), (4) Date: Sep. 29, 2011

(87) PCT Pub. No.: WO2010/102967
PCT Pub. Date: Sep. 16, 2010

(65) Prior Publication Data
US 2012/0070304 A1    Mar. 22, 2012

Related U.S. Application Data

(60) Provisional application No. 61/159,997, filed on Mar. 13, 2009.

(30) Foreign Application Priority Data

Mar. 13, 2009    (DK) .................................. 2009 00358

(51) Int. Cl.
*F03D 11/00* (2006.01)
*F03D 1/00* (2006.01)
(52) U.S. Cl.
CPC ............... *F03D 1/003* (2013.01); *Y02E 10/722* (2013.01); *F05B 2260/30* (2013.01); *F03D 11/00* (2013.01)
USPC .................................. 416/169 R; 416/244 R

(58) Field of Classification Search
CPC .............................. F03D 1/003; F05B 2260/30
USPC ..................................... 416/169 R, 244 R, 248
See application file for complete search history.

(56) References Cited

U.S. PATENT DOCUMENTS

| 2003/0102677 A1 | 6/2003 | Becker et al. | |
| 2006/0196288 A1* | 9/2006 | Aust et al. .................... | 74/411.5 |

(Continued)

FOREIGN PATENT DOCUMENTS

| DE | 10 2004 028 746 | 12/2005 |
| DE | 10 2007 058 746 | 12/2008 |

(Continued)

OTHER PUBLICATIONS

Paolo Burattini; International Preliminary Report on Patentability issued in priority international patent application No. PCT/EP2010/052881; Sep. 13, 2011; 5 pages; European Patent Office.

(Continued)

*Primary Examiner* — Liam McDowell
(74) *Attorney, Agent, or Firm* — Wood, Herron & Evans, LLP

(57) ABSTRACT

A locking arrangement for locking a hub (1) of a wind turbine against rotational movement is disclosed. The locking arrangement comprises at least one first locking part (6) and at least one second locking part (8). The first locking part(s) (6) is/are movable along a substantially radial direction relative to the rotational axis of the hub (1), between a locking position and a release position. Each second locking part (8) is adapted to retain a first locking part (6) when the first locking part (6) is in the locking position. The first locking part(s) (6) and the second locking part(s) (8) are arranged with one of them on the hub (1) and the other one on the base frame (5). Thereby, a first locking part (6) and a second locking part (8) prevent rotational movement of the hub (1) relative to the base frame (5) when the first locking part (6) is in the locking position, and allow such movement when the first locking part (6) is in the release position.

19 Claims, 3 Drawing Sheets

(56) References Cited

U.S. PATENT DOCUMENTS

| | | | |
|---|---|---|---|
| 2010/0021299 A1* | 1/2010 | Aarhus et al. | 416/31 |
| 2010/0194114 A1* | 8/2010 | Pechlivanoglou et al. | 290/55 |
| 2010/0232978 A1* | 9/2010 | Nielsen et al. | 416/248 |

FOREIGN PATENT DOCUMENTS

| | | |
|---|---|---|
| EP | 1 167 755 | 1/2002 |
| EP | 1 291 521 | 3/2003 |
| EP | 1 617 075 | 1/2006 |
| EP | 1 748 182 | 1/2007 |
| EP | 1 772 624 | 4/2007 |
| EP | 2148090 A1 | 1/2010 |
| KR | 10 0821704 | 4/2008 |
| WO | 2008/059088 | 5/2008 |

OTHER PUBLICATIONS

Jens Skou; 1st Technical Examination and Search Report issued in priority Denmark Application No. PA 2009 00358; Oct. 27, 2009; 6 pages; Denmark Patent and Trademark Office.

Paolo Burattini; International Search Report issued in priority International Application No. PCT/EP2010/052881; Apr. 26, 2011; 5 pages; European Patent Office.

European Patent Office, Office Action issued in corresponding European Application No. 10706674.8, dated Aug. 2, 2014, 4 pages.

* cited by examiner

ROTOR LOCK FOR A WIND TURBINE

FIELD OF THE INVENTION

The present invention relates to a locking arrangement for locking a hub of a wind turbine against rotational movements relative to a base frame of the nacelle of the wind turbine. Such a locking arrangement is, e.g., required for safety purposes in order to prevent the hub from rotating during maintenance of the wind turbine.

BACKGROUND OF THE INVENTION

Various components of a wind turbine, including components arranged in or near the nacelle, such as drive train, main shaft, generator, main bearing or hub, sometimes require maintenance, repair or replacement. It is therefore necessary to allow maintenance personnel to gain access to these parts in order to allow them to perform the required maintenance, repair or replacement. This will sometimes include gaining access to an interior part of the hub. For safety reasons the rotor must be prevented from performing rotational movements during such maintenance operations.

A number of locking arrangements have previously been suggested in order to provide a suitable locking of the rotor against rotational movements. WO 2008/059088 A1 discloses an adjustable, self-aligning rotor locking device for an aerogenerator, comprising a rotor, a nacelle structure housing power generating means coupled to the hub of the rotor, braking means and means for controlling the rotational position of the power train. The nacelle structure and the hub of the rotor are arranged so as to prevent the rotor hub from rotating during certain maintenance and assembly operations. The arrangement includes at least one mobile pin in the nacelle, actuation means for pushing/pulling the pin axially in relation to at least one corresponding hole in the hub.

EP 1 291 521 A1 discloses a wind turbine comprising a nacelle on a tower. The wind turbine is provided with a rotor lock device for locking a rotor disk and fixation means for fixing the rotor disk to the nacelle. The rotor lock device comprises an axially movable pin arranged on the nacelle structure and corresponding apertures formed in the rotor disk.

Thus, WO 2008/059088 A1 and EP 1 291 521 A1 both disclose rotor locking arrangements in which a movable member is moved along a substantially axial direction between a position in which the rotor is locked against rotational movements and a position in which the rotor is allowed to perform rotational movements. A disadvantage of such an arrangement is that it is not possible to use the locking mechanism directly for absorbing tilt or yaw loads, e.g. in the case that the support for the main shaft, or the main shaft itself, needs to be removed during the maintenance operation. Another disadvantage is that it is difficult and relatively expensive to manufacture the hub in a manner which allows the axial movement of the locking parts.

EP 1 617 075 A1 discloses a method and an apparatus for changing a transmission of a wind power installation. The rotor shaft is supported on the machine frame during the transmission change operation by means of a support at the transmission side so that the rotor is permitted to remain on the rotor shaft during the transmission change. The support is a yoke which is mounted between the rotor shaft and the machine frame immediately prior to the transmission change and is removed again immediately after the transmission change. In the case that the drive train is suspended in the nacelle by means of a so-called three point suspension, the yoke supports the main shaft when the gear is removed during a replacement operation, thereby removing part of the normal support of the drive train. The yoke may further prevent the main shaft from performing rotational movements, due to friction between the yoke and the main shaft. However, this rotational locking is too unreliable to be used as a safety measure during maintenance operations.

DESCRIPTION OF THE INVENTION

It is an object of the invention to provide a locking arrangement for a hub of a wind turbine which is capable of preventing rotational movements of the hub as well as tilt and/or yaw movements of the hub.

It is a further object of the invention to provide a locking arrangement for a hub of a wind turbine which is capable of preventing rotational movements of the hub during removal or replacement of the main shaft.

It is an even further object of the invention to provide a locking arrangement for a hub of a wind turbine in which rotational locking of the hub is more reliable than the locking provided by prior art locking arrangements.

It is an even further object of the invention to provide a locking arrangement for a hub of a wind turbine, wherein the locking arrangement is easier and more cost effective to manufacture than prior art locking arrangements.

According to the invention there is provided a locking arrangement for a hub of a wind turbine, said hub being adapted to perform rotational movements about a rotational axis, said wind turbine comprising a nacelle having a base frame, the locking arrangement comprising:

- at least one first locking part, the first locking part(s) being movable along a substantially radial direction relative to the rotational axis of the hub, between a locking position and a release position, and
- at least one second locking part, each second locking part being adapted to retain a first locking part when the first locking part is in the locking position, wherein one of the first locking part(s) and the second locking part(s) is/are formed in or mounted on the hub, and the other of the first locking part(s) and the second locking part(s) is/are formed in or mounted on the base frame, a first locking part and a second locking part thereby preventing rotational movement of the hub relative to the base frame when the first locking part is in the locking position, and allowing such movement when the first locking part is in the release position.

Modern wind turbines normally comprise a tower construction carrying a nacelle. The nacelle carries a rotor with a hub having a set of turbine blades attached thereto, and it accommodates various components used for converting energy of the wind into electrical energy, e.g. a generator and a drive train. The nacelle is mounted on top of the tower construction in such a manner that it is capable of performing rotating movements about a substantially vertical axis, thereby allowing the wind turbine to direct the turbine blades in the direction of the wind. The nacelle normally has a base frame, forming a structural part of the nacelle, and a cover defining a closed interior part of the nacelle which is used for accommodating the components mentioned above.

During operation wind interacts with the turbine blades and causes rotation of the rotor about a rotational axis which is arranged in a substantially horizontal, possibly slightly inclined, plane. This rotation is transformed into electrical energy which is subsequently supplied to a grid. Thus, during operational conditions the rotor must be allowed to rotate.

However, in the case that it is necessary to perform maintenance, repair or replacement on one or more of the components accommodated in the nacelle, or on the rotor, the presence of maintenance personnel in the nacelle, and possibly in the vicinity of or even in an interior part of the rotor, is required. When maintenance personnel are present in these regions of the wind turbine, rotation of the rotor can lead to dangerous and possibly fatal situations. It is therefore a requirement that the rotor is prevented from performing rotating movements under these circumstances. The locking arrangement of the invention can be used for locking the hub, and thereby the rotor, against rotating movements.

The locking arrangement comprises at least one first locking part and at least one second locking part. Each of the first locking part(s) is movable along a substantially radial direction. In the present context the term 'substantially radial direction' should be interpreted to mean a direction which is substantially perpendicular to a direction defined by the rotational axis about which the hub rotates during normal operation of the wind turbine, and which intersects the rotational axis. Radial movements of the first locking part cause the first locking part to be moved between a locking position and a release position. When the first locking part is in the locking position, the locking arrangement locks the hub against rotational movements, and when the first locking part is in the release position, the locking arrangement allows the hub to perform rotational movements, i.e. the wind turbine is allowed to operate in a normal manner. This will be explained further below.

The second locking part is adapted to retain a first locking part when the first locking part is in the locking position. Thus, interaction between a first locking part and a second locking part causes these two locking parts to be locked together, thereby causing the parts of the wind turbine which carries the two locking parts to be locked together.

One of the first locking part(s) and the second locking part(s) is/are formed in or mounted on the hub, and the other of the first locking part(s) and the second locking part(s) is/are formed in or mounted on the base frame. Thus, in one embodiment, the first locking part(s) is/are formed in or mounted on the hub, while the second locking part(s) is/are formed in or mounted on the base frame. Alternatively, the first locking part(s) may be formed in or mounted on the base frame, while the second locking part(s) is/are formed in or mounted on the hub. In any event, when a first locking part is moved to the locking position, thereby being retained by a second locking part, the hub and the base frame are locked to each other by means of the first locking part and the second locking part. Thereby the hub is not allowed to perform rotational movements relative to the base frame when the first locking part(s) is/are in the locking position. However, when each of the first locking part(s) is in the release position, the hub and the base frame are not locked together, and the hub is therefore allowed to perform rotational movements relative to the base frame, i.e. the wind turbine is allowed to operate in a normal manner.

Thus, the locking arrangement may advantageously be operated in the following manner. During normal operation each of the first locking part(s) is in the release position. When it is desired to perform maintenance, repair or replacement requiring the presence of maintenance personnel in the nacelle, some or all of the first locking part(s) is/are moved to the locking position, thereby preventing the hub from performing rotational movements. When the maintenance, repair or replacement has been completed, the first locking part(s) is/are moved back to the release position, and the wind turbine is once again allowed to operate in a normal manner.

It should be noted that the first/second locking part(s) may be formed directly in or form an integral part of the hub/base frame. Alternatively, the first and/or the second locking part(s) may be (a) separate part(s) mounted on the hub/base frame.

It is an advantage that the locking arrangement directly locks the hub and the base frame because the locking arrangement is thereby completely independent of the drive train. This makes it possible to remove or replace all components of the drive train, including a main shaft, while the rotor is efficiently prevented from performing rotating movements.

It is an advantage that the movement causing the hub and the base frame to be locked to each other is performed along a substantially radial direction, rather than along a substantially axial direction, because the radial movement introduces less play in the connection between the locking parts. Furthermore it is easier and more cost effective to manufacture the hub and the base frame with locking parts which can engage along a substantially radial direction than with locking parts which can engage along a substantially axial direction. Furthermore, the point of engagement between a first locking part and a second locking part can be located at a larger distance from the rotational axis of the hub, thereby resulting in a larger lever arm and consequently a larger torque of the locking movement. Accordingly, an improved locking between the hub and the base frame is obtained. Finally, the radial locking movement allows the locking arrangement to directly absorb tilt or yaw loads of the hub without requiring additional locking means or support means, such as the support means disclosed in EP 1 617 075 A1.

Each of the first locking part(s) may comprise a movable pin, and each of the second locking part(s) may comprise an opening adapted to receive a pin of a first locking part. According to this embodiment, the pin is moved in a direction towards an opening when the first locking part is moved from the release position to the locking position, thereby causing the pin to be received and retained by means of the opening, and the pin is moved in a reverse direction when the first locking part is moved from the locking position to the release position.

The pin(s) and the opening(s) may advantageously have substantially circular cross sections of substantially identical diameter, since it is very easy to produce pins and openings having a circular cross section. However, the cross sections of the pin(s) and the opening(s) may have any desired shape, including square, rectangular, triangular, hexagonal, oval, etc., as long as the cross sectional shape of the pin(s) and the cross sectional shape of the opening(s) match each other, thereby allowing a pin to be received in an opening.

The pin(s) and the opening(s) may have matching tapered shapes in such a manner that the pin(s) is/are tapered in a direction towards the opening(s). This makes it possible to allow a pin to be received in an opening, even if the pin and the opening are not positioned exactly at corresponding positions. However, a matching tapered shape of the opening ensures a firm engagement between the pin and the opening once the first locking part has been moved to the locking position.

The movements of the first locking part(s) may be performed by means of a mechanical pump, by means of a hydraulic actuator, by means of an electrical actuator, in a manual manner, e.g. using a threaded spindle, or in any other suitable manner. Movement of the first locking part(s) may be initiated locally, e.g. by maintenance personnel present on the site of the wind turbine. Alternatively or additionally, it may be possible to initiate movement of the first locking part(s) from a remote position, e.g. by sending a signal to one or more actuators used for performing the movements. In this case the hub may already be locked when the maintenance personnel arrives at the site. This may be an advantage in the case that the wind turbine is arranged at an offshore location, since the maintenance personnel may, in this case, arrive by helicopter, and it may be an advantage that the hub, carrying the turbine blades, is not rotating when the helicopter arrives. Furthermore, one activation mechanism may be used for performing movements of two or more first locking parts, and possibly all the first locking parts of the locking arrangement.

The second locking part(s) may be formed in a flange part of the hub or the base frame. The flange part may form an integral part of the hub or the base frame. In this case the flange part may, e.g., be cast directly together with the hub or the base frame, or it may be machined directly into the hub or the base frame. Alternatively, the flange part may be a separate part which is subsequently mounted on the hub or the base frame, e.g. by welding or by means of bolts or screws.

As an alternative to the flange part, the second locking part(s) may be formed directly into another part of the hub or the base frame.

The locking arrangement may comprise at least two first locking parts and at least two second locking parts. According to this embodiment, the locking arrangement is capable of locking the hub and the base frame together in at least two positions. The at least two first locking parts may be arranged substantially opposite to each other, i.e. angularly spaced with 180° between the two first locking parts. It should be noted that this does not rule out that additional first locking parts are arranged between the two oppositely arranged first locking parts.

It should be noted that the number of first locking parts and the number of second locking parts are not necessarily identical. For instance, the locking arrangement may comprise two first locking parts and four second locking parts. This could potentially allow the hub and the base frame to be locked to each other at four different mutual positions.

The locking arrangement may comprise at least 12 second locking parts, the second locking parts being arranged with substantially equal angular distance between neighbouring second locking parts. In the case that the locking arrangement comprises exactly 12 second locking parts, the second locking parts will be arranged angularly spaced with 30° between neighbouring second locking parts. In the case that the wind turbine comprises three turbine blades, this would allow the hub to be locked to the base frame at a position where a turbine blade is directed downwards, at a position where a turbine blade is directed upwards, a position where a turbine blade is directed horizontally to the right and a position where a turbine blade is directed horizontally to the left.

The locking arrangement may further comprise a sensor device arranged to detect whether or not a first locking part and a second locking part are arranged at corresponding positions. When a first locking part and a second locking part are arranged at corresponding positions, the first locking part can be moved to the locking position and be received and retained by the second locking part. On the other hand, when a first locking part is not arranged at a position corresponding to a position of a second locking part, it is not possible to move the first locking part to the locking position and be received and retained by a second locking part. Thus, according to this embodiment, the sensor device can detect whether or not the relative position of the hub and the base frame allows the locking arrangement to be activated to lock the hub against rotational movements relative to the base frame. This detection can be used for carefully moving the hub to a position where it is possible to lock it, and subsequently initiate the locking.

The locking arrangement may further be adapted to prevent tilt and/or yaw movements of the hub when at least one first locking part is in the locking position. As mentioned above, the radial movement of the first locking part(s) between the locking position and the release position in itself makes this possible. This allows all components of the drive train, including the main shaft and including the gear in case of a three-point suspension of the drive train, to be removed without requiring additional support arrangements, and without having to remove the hub.

The locking arrangement may further comprise a yoke part arranged to cooperate with the first locking part(s) and the second locking part(s) in order to prevent tilt and/or yaw movements of the hub. The yoke part may be adapted to be detachably mounted on the base frame or the hub. In this case the yoke part may be mounted on the base frame only when the maintenance operation requires that the gear or the main shaft is removed. The yoke part can be removed again when the maintenance operation has been completed. As an alternative, the yoke part may be permanently mounted on the base frame, or it may form an integral part of the base frame.

The locking arrangement may further comprise a safety system, said safety system preventing access to an interior part of the hub when the first locking part(s) is/are in the release position. The safety system may, e.g., be coupled to a locking system of a hatch or a door arranged across an opening creating access to the hub. In this case the safety system may prevent the locking system from being unlocked if the first locking part(s) is/are in the release position, i.e. if the hub is allowed to rotate relative to the base frame. Thereby it is ensured that maintenance personnel can only gain access to the interior part of the hub if the hub is securely locked to the base frame.

A part of the base frame may substantially circumscribe a part of the hub. According to this embodiment, first and second locking parts can be arranged along the entire perimeter circumscribing the rotational axis of the hub, and thereby it is possible to distribute the locking forces between the hub and the base frame in an even manner. Furthermore, when the base frame substantially circumscribes a part of the hub, the base frame helps in absorbing the tilt and yaw movements of the hub as described above.

As an alternative, the base frame may only circumscribe part of the hub.

The locking arrangement may further comprise means for fixating the first locking part(s) in the locking position. The fixating means may be of a pure mechanical kind, such as a block, a pin, a spindle inserted into each first locking part in such a manner that the first locking part(s) is/are prevented from moving to the release position. The fixating means provides an additional safety measure during maintenance, repair or replacement of components in the vicinity or in an interior part of the hub.

As described above, when it is desired to perform this kind of maintenance operation, the maintenance personnel initially ensures that the first locking part(s) is/are moved to the locking position, thereby preventing rotation of the hub relative to the base frame. When this has been ensured, the maintenance operation is initiated, and this possibly includes that maintenance personnel enters an interior part of the hub. There is, however, a risk that the first locking part(s) is/are accidentally moved to the release position before the maintenance operation has been completed, potentially leading to dangerous situations. This risk may, e.g., be present when it is possible to activate movements of the first locking part(s) from a remote position. It may also be present in the case that the first locking part(s) is/are activated by means of a hydraulic or a pump system, in which case the first locking part(s) may be moved to the release position in case of a failure in the activating system, e.g. due to a leaking or bursting oil pipe. Furthermore, if the first locking part(s) is/are in the form of tapered pins, the risk that they are moved to the release position during a failure as described above is increased. Fixating the first locking part(s) in the locking position prevents these situations and eliminates the risk that the hub accidentally starts rotating during the maintenance operation.

The locking arrangement of the invention may advantageously form part of a wind turbine further comprising a tower construction, a nacelle, and a rotor carrying a set of turbine blades.

BRIEF DESCRIPTION OF THE DRAWINGS

The invention will now be described in further detail with reference to the accompanying drawings in which.

DETAILED DESCRIPTION OF THE DRAWINGS

Figure 1:
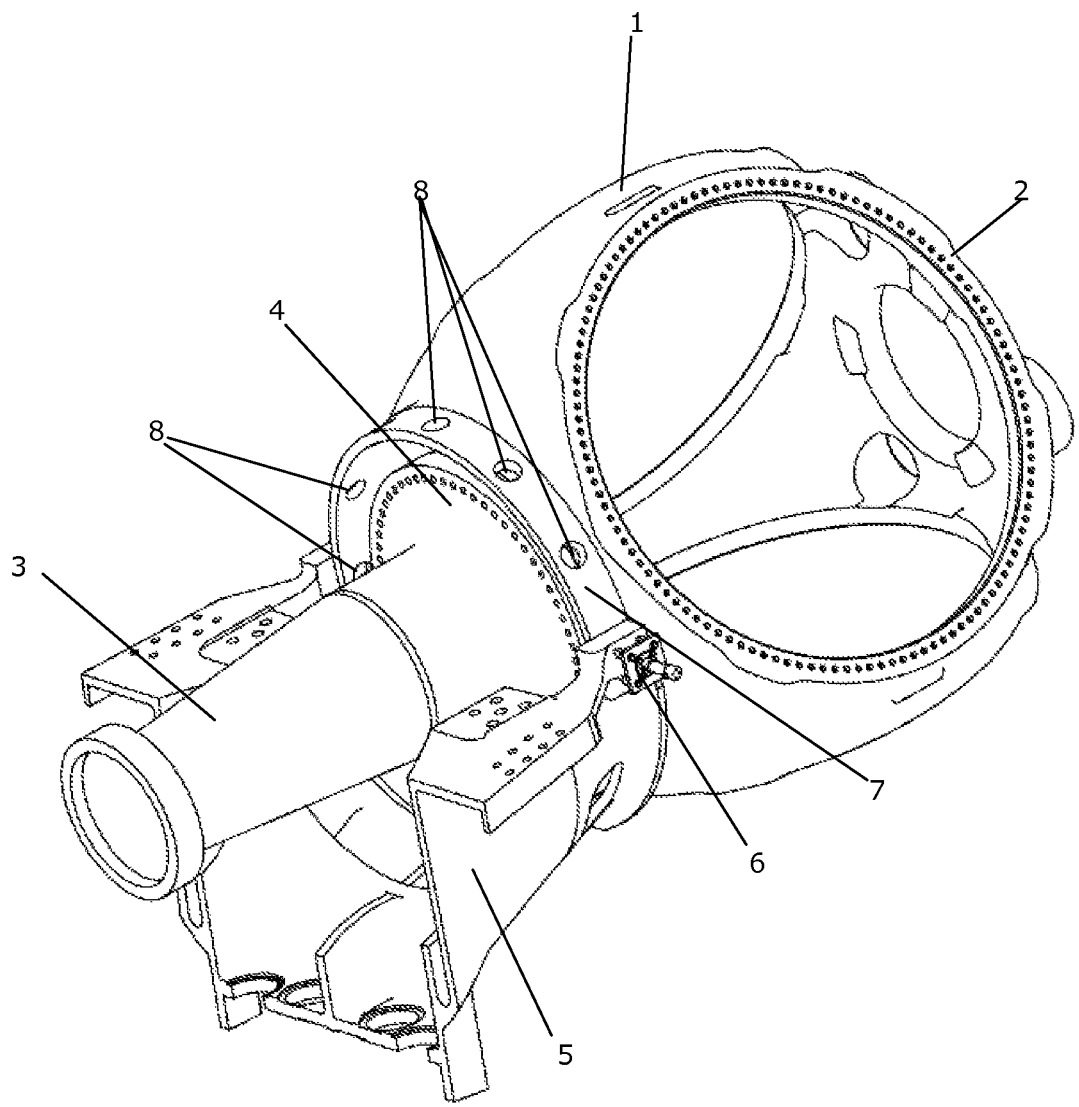
FIG. 1 is a perspective view of a part of a wind turbine having base frame and a hub with a locking arrangement according to an embodiment of the invention arranged thereon.

FIG. 1 is a perspective view of parts of a wind turbine. For the sake of clarity, some parts, such as the tower construction and the nacelle, have been omitted, thereby revealing parts which are relevant for the purpose of describing the present invention.

FIG. 1 shows a hub 1 having three blade flange parts 2, each being adapted to have a turbine blade attached thereto. FIG. 1 further shows a main shaft 3 attached to the hub 1 via flange 4, and the main shaft 3 therefore rotates along when the hub 1 rotates. The main shaft 3 is further connected to a gear arrangement (not shown). Finally, FIG. 1 shows part of a base frame 5.

Two first locking parts 6, one of which is visible, are arranged at opposite positioned, i.e. angularly spaced with 180° between them. The first locking parts 6 are in the form of pins which are movable in a substantially radial direction, i.e. substantially perpendicularly to a direction defined by the rotational axis of the hub 1 or a direction defined by a longitudinal direction of the main shaft 3. This will be described in further detail below with reference to FIGS. 3 and 4.

The hub 1 is provided with a flange part 7 having twelve openings 8, five of which are visible, formed therein. The openings 8 are arranged substantially equidistantly along the perimeter defined by the flange part 7, i.e. with an angular spacing of approximately 30° between neighbouring openings 8. The openings 8 constitute second locking parts. In the embodiment shown in FIG. 1 the flange part 7 forms an integral part of the hub 1.

When the relative position of the hub 1 and the base frame 5 is such that an openings 8 is arranged adjacent to each of the first locking parts 6, the pins of the first locking parts 6 can be moved along a substantially radial direction towards the flange part 7, and the pins are received in the openings 8. Thereby the pins and the openings 8 in combination prevent the hub 1 from performing rotational movements relative to the base frame 5, i.e. the hub 1 is locked.

Due to the large number of openings 8 formed in the flange part 7, it is possible to lock the hub 1 and the base frame 5 together at relative positions which are angularly spaced apart at approximately 30°.

Figure 2:
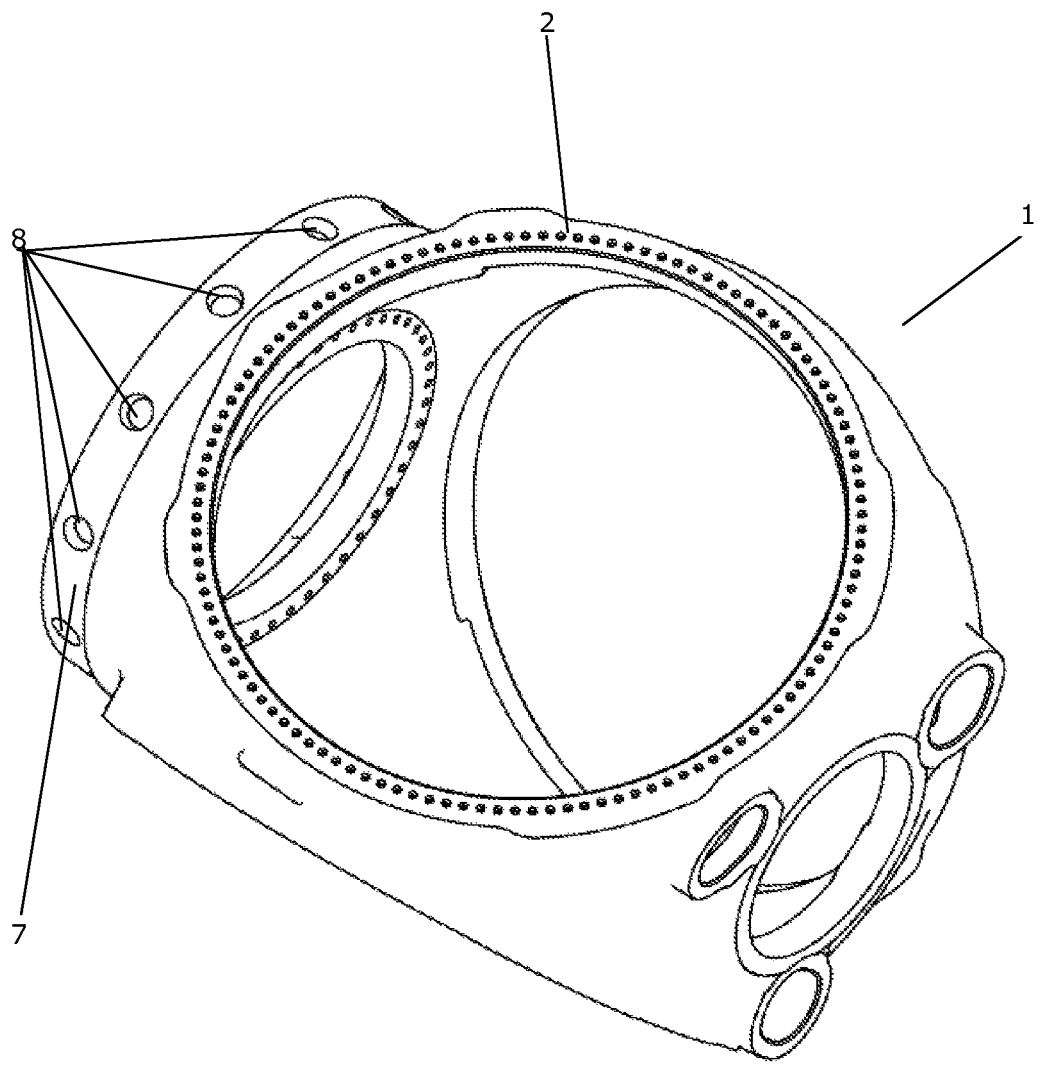
FIG. 2 is a perspective view of the hub of the wind turbine of FIG. 1.

FIG. 2 is a perspective view of the hub 1 of FIG. 1, seen from a different angle. The flange part 7 and six of the openings 8 can clearly be seen.

Figure 3:
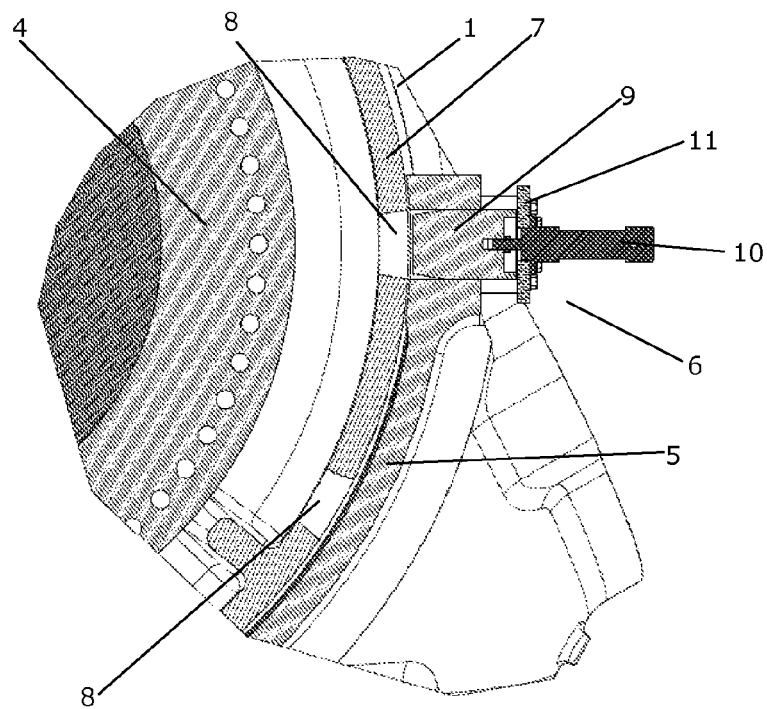
FIG. 3 is a cross sectional view of the locking arrangement arranged on the wind turbine of FIG. 1, the locking arrangement being in a release position.
Figure 4:
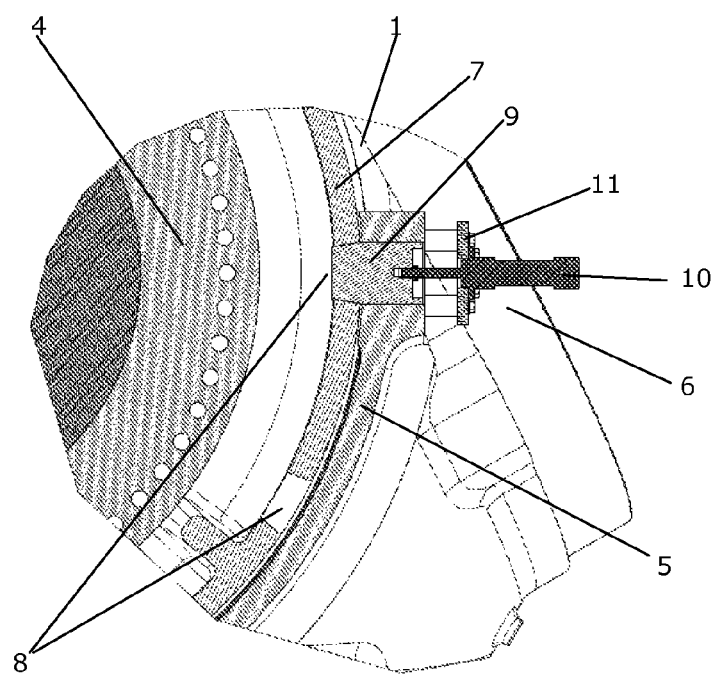
FIG. 4 is a cross sectional view of the locking arrangement arranged on the wind turbine of FIG. 1, the locking arrangement being in a locking position.

FIGS. 3 and 4 are cross sectional views of part of the locking arrangement arranged on the wind turbine of FIG. 1. One of the first locking parts 6 can be seen. In FIG. 3 the first locking part 6 is in a release position and in FIG. 4 the first locking part 6 is in a locking position.

The first locking part 6 comprises a pin 9 which is connected to a pump cylinder 10. When the pump cylinder 10 is activated, the pin 9 is pushed in a direction towards the flange part 7. The pin 9 has a tapered shape. Therefore the diameter of the outermost part of the pin 6 is smaller than the diameter of the opening 8 at the position which is closest to the base frame 5. This can be clearly seen in FIG. 3. This allows the pin 9 to be moved into the opening 8, even if the pin 9 and the opening 8 are not perfectly aligned. In FIG. 3 the relative position of the hub 1 and the base frame 5 is such that the pin 9 and the opening 8 are perfectly aligned, and it is therefore possible to move pin 9 into the opening 8, thereby moving the first locking part 6 to the locking position.

FIG. 4 shows the first locking part 6 in the locking position. It can be seen that the pump cylinder 10 has been activated to push the pin 9 towards the opening 8 by means of a piston. The opening 8 has a tapered shape which matches the tapered shape of the pin 9. This allows the pin 9 to fit snugly into the opening 8 when the pin 9 has been moved completely to the locking position, as shown in FIG. 4.

In FIGS. 3 and 4 it can also be seen that a space is defined between a wall part of the base frame 5 and a plate 11 used for mounting the first locking part 6 on the base frame 5. This allows maintenance personnel to visually inspect whether or not the first locking part 6 has been moved to the locking position, thereby rendering it safe to initiate the maintenance operation. Furthermore, it is possible to mechanically lock the first locking part 6 in the locking position by positioning a block or the like in the space, thereby preventing that the pin 9 is moved back to the release position shown in FIG. 3. This prevents that the first locking part 6 is accidentally moved to the release position during maintenance. This is in particular advantageous in the case that it is possible to activate the first locking part 6 remotely.

The invention claimed is:
1. A wind turbine, comprising:
a tower;
a nacelle supported by the tower and including a base frame;
a rotor including a hub adapted to perform rotational movements about a rotational axis and a plurality of turbine blades coupled to the hub; and
a locking arrangement, comprising:
a first locking part movable along a substantially radial direction relative to the rotational axis of the hub between a locking position and a release position; and
a second locking part adapted to retain the first locking part when the first locking part is in the locking position, wherein one of the first locking part and the second locking part is formed in or mounted on the hub, and the other of the first locking part and the second locking part is formed in or mounted on the base frame, the first locking part and the second locking part thereby preventing rotational movement of the hub relative to the base frame when the first locking part is in the locking position, and allowing such movement when the first locking part is in the release position, wherein the first locking part is configured to prevent tilt and/or yaw movements of the hub when the first locking part is in the locking position, and wherein the locking arrangement further comprises a fixing device for preventing the movement of the first locking part away from the locking position, the fixing device being incapable of actively moving the first locking part relative to the second locking part, and the fixing device being positionable between and engageable with the first locking part and the base frame to block movement of the first locking part away from the locking position.

2. The wind turbine of claim 1, wherein the first locking part includes a movable pin with a tapered outermost portion, and the second locking part includes a tapered opening that snugly receives the tapered outermost portion of the movable pin in the locking position.

3. The wind turbine of claim 1, wherein the locking arrangement includes a mounting plate coupled to the base frame so as to define a space between the mounting plate and the base frame, the space enabling visual confirmation as to whether the first locking part is in the locking position or the release position.

4. The wind turbine of claim 1, wherein the second locking part is formed in a flange part of the hub or the base frame.

5. The wind turbine of claim 4, wherein the flange part forms an integral part of the hub or the base frame.

6. The wind turbine of claim 1, wherein the locking arrangement comprises at least two first locking parts and at least two second locking parts.

7. The wind turbine of claim 6, wherein the at least two first locking parts are arranged substantially opposite to each other.

8. The wind turbine of claim 6, wherein the locking arrangement comprises at least 12 second locking parts, the second locking parts being arranged with substantially equal angular distance between neighboring second locking parts.

9. The wind turbine of claim 1, wherein the locking arrangement further comprises a sensor device configured to detect whether or not the first locking part and the second locking part are arranged at corresponding positions.

10. The wind turbine of claim 1, wherein a part of the base frame substantially circumscribes a part of the hub.

11. A wind turbine, comprising:
a tower;
a nacelle supported by the tower and including a base frame;
a rotor including a hub adapted to perform rotational movements about a rotational axis and a plurality of turbine blades coupled to the hub; and
a locking arrangement, comprising:
a first locking part movable along a substantially radial direction relative to the rotational axis of the hub between a locking position and a release position; and
a second locking part adapted to retain the first locking part when the first locking part is in the locking position,
wherein one of the first locking part and the second locking part is formed in or mounted on the hub, and the other of the first locking part and the second locking part is formed in or mounted on the base frame, the first locking part and the second locking part thereby preventing rotational movement of the hub relative to the base frame when the first locking part is in the locking position, and allowing such movement when the first locking part is in the release position, and
wherein the first locking part is configured to prevent tilt and/or yaw movements of the hub when the first locking part is in the locking position,
wherein the locking arrangement includes a mounting plate coupled to the base frame so as to define a space between the mounting plate and the base frame, the space enabling visual confirmation as to whether the first locking part is in the locking position or the release position, and the locking arrangement further comprises a fixing device configured as a block positionable in the space between the mounting plate and the base frame for preventing the movement of the first locking part away from the locking position.

12. The wind turbine of claim 11, wherein the first locking part includes a movable pin with a tapered outermost portion, and the second locking part includes a tapered opening that snugly receives the tapered outermost portion of the movable pin in the locking position.

13. The wind turbine of claim 11, wherein the second locking part is formed in a flange part of the hub or the base frame.

14. The wind turbine of claim 13, wherein the flange part forms an integral part of the hub or the base frame.

15. The wind turbine of claim 11, wherein the locking arrangement comprises at least two first locking parts and at least two second locking parts.

16. The wind turbine of claim 15, wherein the at least two first locking parts are arranged substantially opposite to each other.

17. The wind turbine of claim 15, wherein the locking arrangement comprises at least 12 second locking parts, the second locking parts being arranged with substantially equal angular distance between neighboring second locking parts.

18. The wind turbine of claim 11, wherein the locking arrangement further comprises a sensor device configured to detect whether or not the first locking part and the second locking part are arranged at corresponding positions.

19. The wind turbine of claim 11, wherein a part of the base frame substantially circumscribes a part of the hub.

* * * * *